Sept. 6, 1966 C. PRITCHARD ETAL 3,271,211

PROCESSING SEMICONDUCTIVE MATERIAL

Filed July 24, 1963 2 Sheets-Sheet 1

WITNESSES:
John G. Chopp
James F. Young

INVENTORS
Colin Pritchard and
Samuel A. Zeitman
BY Gordon H. Telfer
ATTORNEY

United States Patent Office 3,271,211

Patented Sept. 6, 1966

3,271,211

PROCESSING SEMICONDUCTIVE MATERIAL

Colin Pritchard, Birmingham, England, and Samuel A. Zeitman, Pittsburgh, Pa., assignors to Westinghouse Electric Corporation, Pittsburgh, Pa., a corporation of Pennsylvania Filed July 24, 1963, Ser. No. 297,343
15 Claims. (Cl. 148—187)

The invention relates in general to the processing of semiconductive material to prepare semiconductor devices and, more particularly, to methods for the formation of rectifying junctions by diffusion of phosphorus into bodies of p-type silicon.

In the manufacture of semiconductor devices, it is usually necessary to introduce impurities into the semiconductive material for the formation of p-n junctions. One widely used method for this purpose is that of diffusion. According to the prior art, it is the practice to expose an etched surface of the semiconductive material, at an elevated temperature, to a vapor including atoms of the impurity to be diffused. The impurity may also be deposited on the surface at a low temperature and then heated to a temperature at which diffusion will take place.

If one wishes to have various junction depths in a surface, more than one diffusion operation is required. That is, for each junction depth one would go through the process of preparing the surface and diffusing impurities into the surface. This repeatedly subjects the semiconductive material to high temperatures and alters the characteristics of the semiconductive material, particularly by shortening the carrier lifetime. The number of steps required in order to form a device with junctions of various depths by diffusion also, of course, makes the process expensive and inconvenient.

It is, therefore, an object of the present invention to provide an improved process for preparing p-n junctions in semiconductive material.

Another object of the invention is to minimize the necessity of etching, masking and diffusing more than one time where junctions of different depth are desired in a single device.

Another object of the invention is to provide an improved process for the diffusion of phosphorus into p-type silicon.

Another object of the invention is to provide a process of making a semiconductor device with varying depths of diffused impurities in a surface.

Briefly, the present invention accomplishes the above cited and other objects by providing a new technique for controlling the diffusion of phosphorus into silicon. The technique includes blackening, such as by an electrolytic method, a silicon surface prior to exposing the surface to phosphorus vapor. It has been found that the blackening operation unexpectedly affects the phosphorus diffusion so that the diffusion depth below the blackened surface is greater than that under the unblackened regions of the surface. This depth difference is a controllable phenomenon depending on the thickness of the blackened layer.

The present invention, together with the above mentioned and additional objects and advantages thereof will become more apparent with reference to the following description, taken in connection with the accompanying drawings, in which.

Referring to FIGS. 1 to 5, the starting material for the practice of this invention is a p-type silicon body 10 which may be prepared by any of the known techniques for obtaining monocrystalline bodies of silicon or by the dendritic growth of silicon as taught in Patent 3,031,-403 by A. I. Bennett. In the practice of the present invention, the surface of the starting material 10 is first cleaned, unless the starting material 10 is obtained from a dendritic crystal in which case surface preparation may be unnecessary. For conventionally grown crystals, the surface may be chemically polished in an etchant known as CP–4 comprising, in concentrated solution, by volume, three parts hydrofluoric acid, three parts acetic acid and five parts nitric acid. Alternatively, the surface may be prepared by lapping or by etching with a hot solution containing about 10% by weight of sodium hydroxide in water at a temperature of about 75° C. to 90° C. The purpose of the surface preparation operation is to remove contaminants from the surface and to make the surface uniform with a high degree of smoothness.

The p-type silicon starting material 10 may be doped with any of the known acceptor type impurities such as boron, aluminum, gallium or indium. The impurity concentration in the starting material is primarily determined by the required characteristics in the device to be fabricated. However, formation of the electrolytically blackened layer used in accordance with this invention has been found to occur most uniformly on starting materials having a resistivity of less than about 10 ohm centimeters and best results have been achieved with starting materials having a resistivity in the range of from about 0.4 ohm centimeter to about 1 ohm centimeter. Strong illumination, during the electrolytic treatment, can be used to improve the quality of the electro-blackened layers on material with a resistivity greater than 1 ohm-centimeter. It is to be understood that the practice of this invention may employ higher resistivity materials as the starting material in the event that the extent of non-uniformity thereby occurring can be tolerated.

Figure 1:
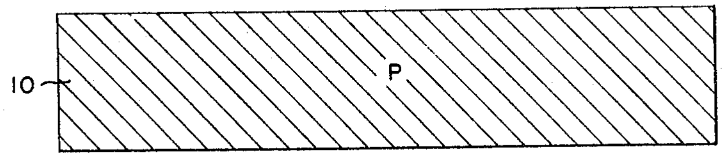
FIGURES 1 through 5 are side views, in cross-section, of a semiconductor body at various stages of the practice of the present invention.
Figure 2:
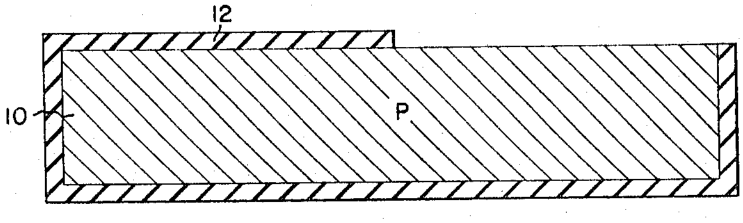

FIG. 2 shows the starting material 10 after there has been deposited on a portion of the surface a masking material 12 so as to leave exposed only a portion of the surface. The masking material 12 may be any material not reactive with the semiconductor material which will protect the starting material from the action of an electrolytic bath. Suitable materials are Apiezon wax or a photo-resist material such as that available under the name KPR. The use of such materials is well known to the art for the selective masking of semiconductive surfaces. As an alternative to the use of a masking material, the starting material 10 may be dipped into the electrolytic bath so only the portion to be blackened is immersed.

Figure 3:
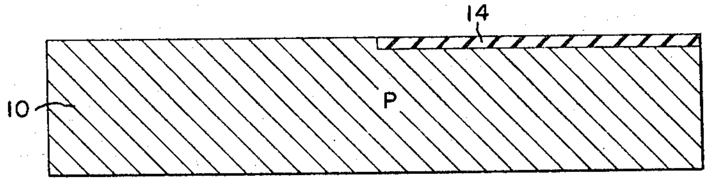
Figure 4:
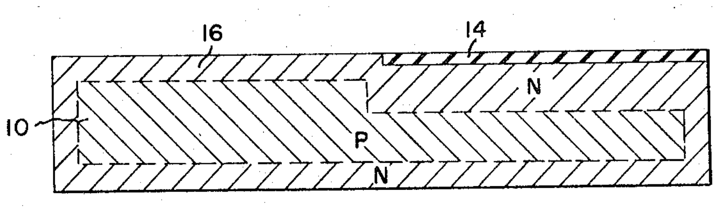
Figure 5:
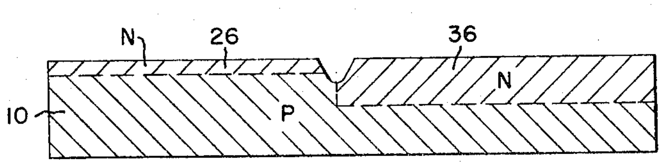

FIG. 3 shows the body of semiconductive material 10 after additional steps have been performed. The first operation performed on the masked semiconductor is the electrolytic blackening of the exposed portion of the starting material so as to produce a blackened silicon layer 14. The electrolytic blackening operation is performed in an electrolytic cell in which the silicon starting material 10 is the anode and the electrolyte is a solution of hydrofluoric acid. In the electrolytic processing, the current density employed must not exceed a maximum value, for if it does, the electrolytically blackened layer desired for the practice of this invention will not be obtained but rather part of the silicon surface will be removed by electrolytic etching. In general, solutions of concentrated hydrofluoric acid (48.9% HF) of at least 50% are suitable. In referring to concentrated hydrofluoric acid herein, the standard concentration containing 48.9% HF is meant. The current density may be readily determined by experiment. It has been formed, however, that it should not exceed about100 milliamperes per square centimeter. Very favorable results have been achieved with the use of a mixture of 87.5% by volume concentrated hydrofluoric acid and 12.5% by volume ethylene glycol as the electrolyte with a current of about 40 milliamperes per square centimeter. This electrolyte is particularly effective when employed on starting materials of low resistivity as previously discussed. The time for which the electrolytic operation is performed is a controllable variable with a longer time resulting in a deeper blackened layer. The following table presents examples of the preparation of an electrolytically blackened layer on p-type silicon suitable for use in the practice of this invention.

After such a diffusion operation, angle lapping to expose both the blackened and unblackened parts of the surface, followed by copper plating of the lapped surface, reveals that the penetration of phosphorus through the blackened portion of the surface is appreciably greater than that in the unblacked portion by a factor in most cases of from about 2 to 2½ times. Consequently, a structure like that shown in FIG. 4 results. An n-type diffused surface layer 16 covers the starting material 10 with a greater junction depth under the blackened layer 14. A device manufacturer may then etch off the surface layer 16 of n-type material from the sides and bottom of the body and form a groove in the top surface of the body to produce the structure illustrated in FIG. 5 to form two distinct n-type regions 26 and 36. The diffusion operation may, alternatively, be performed through one of the known types of masks so as to avoid the necessity of removing part of the surface layer 16.

It is to be understood that the structure illustrated in FIGS.1 to 5 and the structures hereinafter described are merely examples of possible configurations which may

| Surface Preparation | Electrolyte | Current Density (m.a./cm.$^2$) | Time (min.) |
|---|---|---|---|
| Lapped with 1½ min. CP–4 etch | Conc. HF | 50 then 62.5 | 4 / 1 |
| Lapped with 1½ min. CP–4 etch | Conc. HF | 40 | 10 |
| As above, followed by rinse in methyl alcohol, acetone and trichloroethylene. | Conc. HF | 37.5 | 5 |
| Do | Conc. HF | 37.5 | 3 |
| Do | Conc. HF | [1] 100 then 50 | 1 / 3 |
| CP–4 etch | 87.5% Conc. HF, 12.5% glycerine | 26.7 | 5 |
| Do | 75% Conc. HF, 25% glycerine | 35 | 5 |
| Do | 62.5% Conc. HF, 37.5% glycerine | 33.3 | 5 |
| Do | 87.5% Conc. HF, 12.5% ethylene glycol | 35 | 5 |
| Do | 75% Conc. HF, 25% ethylene glycol | 35 | 5 |
| Do | 62.5% Conc. HF, 37.5% ethylene glycol | 35 | 5 |

[1] The period at high current density resulted in etching; the following period at lower current density resulted in uniform blackening.

The electrolytically blackened layer has a black appearance or, in some cases, appears brownish. Chemical analysis indicates that it primarily consists of amorphous silicon. Resistivity measurements indicate that the resistivity of the blackened layer is quite high and it acts as an insulator. The composition of the blackened layer is indicated by presently available information to be within the following ranges:

| | Percent by wt. |
|---|---|
| Amorphous silicon | 75–100 |
| Silicon hydride (one or more silicon hydrides such as SiH, $SiH_2$, $SiH_4$ or polymeric forms) | 0–25 |
| Silicon dioxide | 0–25 |

The structure in FIG. 3 is shown after the electrolytically blackened layer 14 has been formed and the masking material 12 has been removed. In the drawing, the thickness of the blackened layer 14 is greatly exaggerated for clarity. The body is now prepared to be inserted into a diffusion system for the diffusion of phosphorus therein. The phosphorus diffusion may be carried out with known diffusion sources such as the $P_2O_5$ paint-on technique, in an open tube gas flow system, or in a closed tube with elemental phosphorus. The parameters of the diffusion operation may be established in accordance with known phosphorus diffusion techniques. Highly favorable results have been achieved in a closed tube system in an elemental phosphorus vapor with a pressure of from one to two atmospheres at about 1100° C. for up to 70 hours.

result from the practice of this invention and that the particular configuration of junctions formed by this invention in a resulting device may be selected by those skilled in the art. Subsequent fabrication, such as the formation of other junctions as needed, ohmic contacts, lead attachment and encapsulation, may be performed by conventional techniques.

The invention contributes to the flexibility permissible in semiconductor device fabrication by permitting, in a single diffusion, junctions of different depths to be formed due to the unexpected deeper penetration of phosphorus in p-type silicon which has an electro-blackened surface thereon compared to that which occurred in a surface free of an electro-blackened layer. One particularly advantageous area for the application of this technique is in the production of semiconductor integrated circuits wherein regions for the performance of the functions of a plurality of individual circuit elements are produced in a single body of semiconductive material. This technique permits, for example, the formation of a junction to provide diode functions at a greater depth and in the same diffusion as a junction to serve as the base-collector junction of a transistor.

Figure 6:
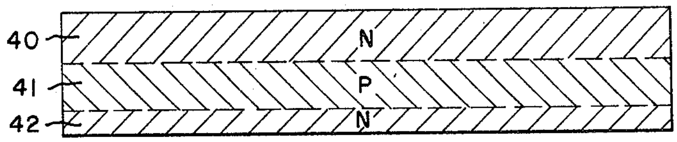
FIG. 6 is a side view, in cross-section, of a semiconductor body formed by the practice of the present invention.

FIG. 6 illustrates a further example of the structure that may be achieved in accordance with the practice of this invention by performing only a single diffusion operation. The structure has contiguous n-, p- and n-regions 40, 41 and 42 of which the significant feature is the uppermost n-region 40 is significantly thicker than the lower n-region 42. For such a structure to be formed on a p-type starting material by vapor diffusion techniques would previously have required two separate diffusion operations. However, in accordance with the techniques described in connection with FIGS. 1 to 5, the provision of an electro-blackened layer on the upper surface of the starting material permits the formation of this structure by a single diffusion operation because of the greater penetration of phosphorus in the silicon which is covered by an electro-blackened layer.

It has not yet been determined with any precision what the reason for the deeper penetration of phosphorus in p-type silicon covered by an electro-blackened layer is. The greater penetration of phosphorus under the blackened surface is not accounted for by the thickness of the blackened layer since electron micrographs of the electro-blackened surface show a uniform oriented fine triangular structure (on a (111) surface) whose size is only of the order of 500 angstroms. The thickness of the blackened layer is in the range of from about 100 angstroms to 1000 angstroms although its exact thickness is not critical to the practice of the present invention. That the mechanism involved is not one which is readily predicted from present knowledge is evidenced by the fact that it does not occur with regularity or to the same extent with other types of starting materials or diffusants that have been studied, although small enhancements in penetration can be found with the diffusion or boron into n-type silicon through blackened layers.

Figure 7:
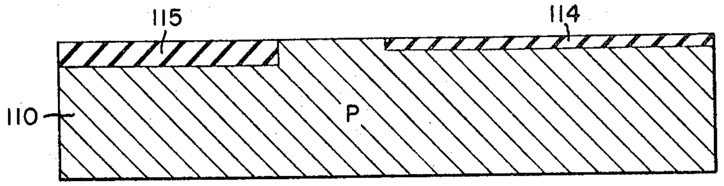
FIGS. 7 to 9 are side views, in cross-section, of a semiconductor body at various stages of the fabrication process illustrating other aspects of the present invention.
Figure 8:
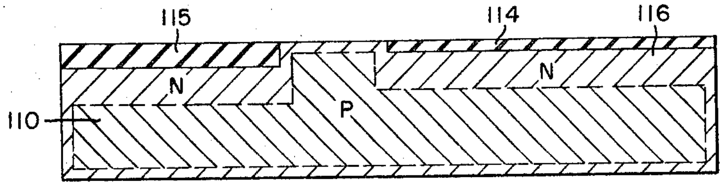
Figure 9:
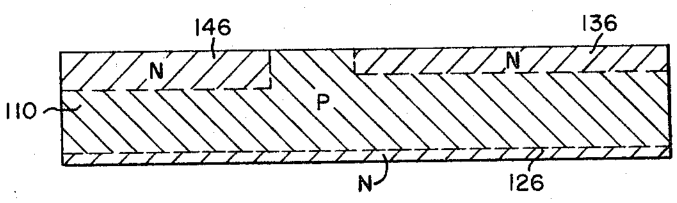

FIGS. 7 to 9 illustrate stages in the fabrication of a device wherein three p-n junctions are formed on a p-type starting material, each of which have a different depth.

In FIG. 7, the starting material 110 is shown with electro-blackened surface layers 114 and 115 on two portions, the electro-blackened surface layers differing in that one is appreciably thicker, produced by a longer electro-blackening process, than the other. Here, as in the other figures of the drawing, the dimensions are not to scale and the thickness of the blackened layers is greatly exaggerated.

A phosphorus diffusion operation results in a structure like that of FIG. 8 wherein the penetration of the phosphorus impurity is greatest in the portion of the surface having a thicker electro-blackened layer and the portion of the surface having the thinner electro-blackened layer is thicker than that on which no electro-blackening was formed. Consequently, a diffused n-type layer 116 having the profile shown is formed. Removal of the electro-blackened layers and the diffused material on the peripheral edges of the body results in the structure shown in FIG. 9 wherein three distinct n-type regions 126, 136 and 146 form p-n junctions to different depths within the starting material 110.

Figure 10:
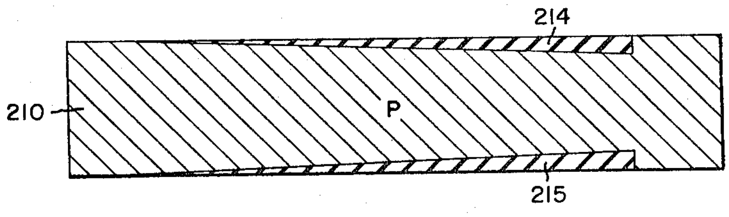
FIGS. 10 to 12 are side views, in cross-section, of a semiconductor body at various stages in the fabrication process to illustrate further aspects of the present invention.
Figure 11:
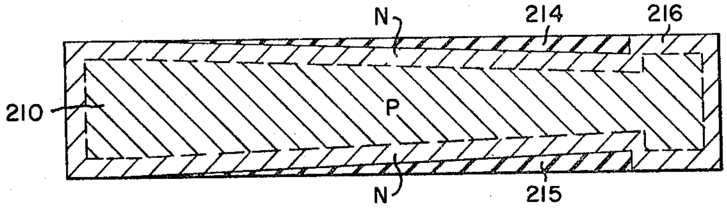
Figure 12:
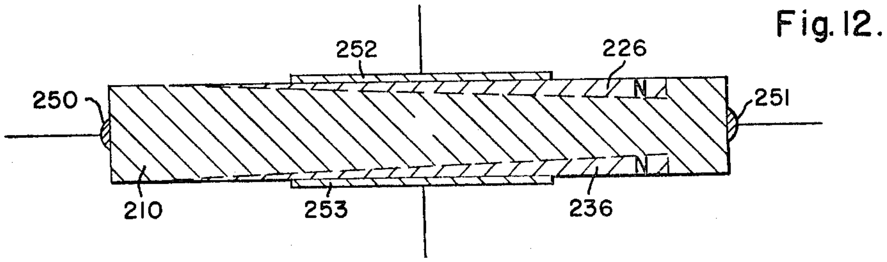

FIGS. 10 to 12 illustrate the use of the present invention to fabricate a device with gradual variation of junction depth. This type of device is a field effect transistor with one or more gate regions of gradually varying depth so that the device pinches off the source to drain current uniformly. Previously in the fabrication of such a device, it was necessary to machine the starting material to provide sloping surfaces into which the diffusion would occur in a uniform manner to result in the varying spacing of the gate junctions. In accordance with this invention, referring to FIG. 10, the starting material 210 has formed thereon two layers 214 and 215 of electro-blackened material of varying thickness. This may be produced by, for example, raising the body of silicon from the electrolytic bath at a controlled rate which results in a gradual increase in the time of the operation and in the current density, the result being that that portion of the silicon which is in the electrolytic bath for a longer time has a thicker electro-blackened layer thereon. Consequently, upon performing diffusion with phosphorus, a structure like that of FIG. 11 results having an n-type surface layer 216 which after selective surface etching results in the device of FIG. 12. Contacts 250 and 251 at the ends, serving as source and drain contacts, and gate contacts 252 and 253 on the diffused n-type regions are provided.

One further example of an application of this invention is simply that of using an electro-blackened surface layer, not to obtain junctions of differing depths, but to obtain a single junction in p-type silicon to a deeper depth within a shorter time than is possible without use of the electro-blackened layer.

In addition, the electro-blackened layer may be used as a mask for selective diffusion. In this case, the blackened layer is formed in the pattern of the desired junction, the silicon is diffused and the diffused layer is removed by etching to a depth such that only the deeper diffused region under the blackened layer remains.

Through the practice of this invention, it is believed apparent that it is possible to fabricate more readily many different devices than presently, particularly those which require diffused n-type junctions in a p-type starting material to differing depths.

The following table presents merely a few examples of results obtained by the practice of this invention indicating the difference in depths of junctions produced by phosphorus diffusion in p-type silicon under electro-blackened surfaces and under surfaces which are not electro-blackened. The formation of the electro-blackened layers for the following examples was in accordance with the techniques for electrolytically blackening discussed hereinbefore. $C_a$ is the impurity concentration in the starting material.

| $C_a$ (cm.$^{-3}$) | Junction Depth (microns) | | Diffusion Parameters |
|---|---|---|---|
| | Unblackened | Blackened | |
| $5\times10^{16}$ | 7 | 17.5 | 66 hrs. at 1,060° C. |
| $2\times10^{16}$ | 5.5 | 14.5 | Do. |
| $2\times10^{16}$ | 4.2 | 10 | 24 hrs. at 1,060° C. |
| $2\times10^{16}$ | 8.5 | 20 | 24 hrs. at 1,150° C. |

The above diffusions were performed in a closed tube containing elemental red phosphorus to an extent sufficient to give about 1.5 atm. pressure of phosphorus at diffusing temperature.

A different diffusion technique, that of painting a solution of $P_2O_5$ in ethylene glycol onto the silicon and then heating it to the diffusion temperature in air, also produced greater junction depths under the electro-blackened surface as indicated by the following results.

| $C_a$ (cm.$^{-3}$) | Junction Depth (microns) | | Diffusion Parameters |
|---|---|---|---|
| | Unblackened | Blackened | |
| $2\times10^{16}$ | 2.3 | 3.9 | 24 hrs. at 950° C. |
| $7\times10^{16}$ | 23.5 | 45 | 66 hrs. at 1,150° C. |

While the present invention has been shown and described in a few forms only, it will be apparent that various modifications may be made without departing from the spirit and scope thereof.

What is claimed is:

1. The method of diffusing phosphorus into a surface of a silicon substrate which comprises: forming a blackened layer on at least a portion of said silicon surface by an electrolytic reaction with a solution containing at least 50% by volume of concentrated hydrofluoric acid; and then diffusing phosphorus through said blackened layer into said substrate.

2. The method of controlling the diffusion of phosphorus into a surface of a silicon substrate which comprises: forming a blackened layer in at least a portion of said silicon surface by an electrolytic reaction with a solution containing at least 50% by volume of concentrated hydrofluoric acid; exposing said surface with said blackened layer thereon to phosphorus vapor in a closed tube so that atoms of phosphorus diffuse through said blackened layer into said substrate.

3. The method of selectively varying the depth of diffusion of phosphorus into a silicon substrate which comprises: masking a portion of the surface of said silicon substrate; forming a blackened layer by an electrolytic reaction with a solution containing at least 50% by volume of concentrated hydrofluoric acid on the unmasked portion of said surface; removing the masking from said surface; and exposing said surface to phosphorus vapor in a closed tube so that atoms of phosphorus diffuse into said silicon substrate.

4. The method of controlling the diffusion of phosphorus into a surface of a silicon substrate which comprises: forming a blackened layer in certain portions of said surface by masking portions of said surface, using said silicon as the anode in an electrolytic cell with a solution containing at least 50% by volume of concentrated hydrofluoric acid and passing an electric current through said cell; exposing said blackened layer to phosphorus and heating so that atoms of phosphorus diffuse into said blackened surface.

5. A method of forming p-n junctions in p-type silicon comprising: placing a p-type silicon substrate in an electrolytic cell having as the electrolyte a solution of hydrofluoric acid; passing a current through said electrolytic cell with said silicon substrate as the cell anode, the current being such as to provide a current density of less than about 100 milliamperes for each square centimeter of exposed silicon surface in said electrolyte, to form on said silicon substrate a blackened layer; diffusing phosphorus atoms through said blackened layer into said silicon substrate.

6. A method in accordance with claim 5 also comprising: masking a portion of the surface of said silicon substrate before placing in said electrolytic cell to form said blackened layer only on the unmasked portion of the surface of said silicon substrate.

7. A method in accordance with claim 5 also comprising: masking portions of the surface of said silicon substrate and placing said silicon substrate in said electrolytic cell for at least two treatments to form said blackened layer with different depths on different portions of the surface of said silicon substrate.

8. A method in accordance with claim 5 also comprising: withdrawing said silicon substrate from said electrolytic cell while passing said current to form a blackened layer having a varying thickness.

9. A method in accordance with claim 5 wherein: said diffusing is performed in a closed tube containing an atmosphere with elemental phosphorus therein.

10. A method in accordance with claim 5 wherein: said diffusing is performed by applying to said blackened layer a solution of $P_2O_5$ in ethylene glycol and heating.

11. A method of forming p-n junctions in p-type silicon comprising: forming on a surface of a p-type silicon substrate by electrolytic reaction with a solution containing at least 50% by volume of concentrated hydrofluoric acid a blackened layer having a composition within the range of 75% to 100% by weight of amorphous silicon; and diffusing phosphorus atoms through said blackened layer into said silicon substrate.

12. A method in accordance with claim 11 wherein: said forming of said blackened layer is performed in an electrolytic cell having as the electrolyte a solution of hydrofluoric acid with said silicon substrate as the anode while passing a current of a magnitude to provide a current density of less than about 100 milliamperes for each square centimeter of exposed silicon surface.

13. A method in accordance with claim 11 wherein: said blackened layer also includes an amount of up to 25% by weight of at least one silicon hydride.

14. A method in accordance with claim 11 wherein: said blackened layer also includes an amount of up to 25% by weight of silicon dioxide.

15. A method in accordance with claim 11 wherein: said blackened layer also includes amounts of silicon dioxide and at least one silicon hydride that together comprise up to 25% by weight.

References Cited by the Examiner

UNITED STATES PATENTS

| | | | |
|---|---|---|---|
| 2,930,722 | 3/1960 | Ligenza | 148—189 |
| 3,009,841 | 11/1961 | Faust | 148—187 |

FOREIGN PATENTS

| | | |
|---|---|---|
| 627,260 | 9/1961 | Canada. |

OTHER REFERENCES

Aschner et al.: J. of the Electrochemical Soc., May 1959, pp. 415–417.

Arches: J. of the Physics and Chemistry of Solids, vol. 14, 1960, pp. 104–110.

Turner: The Surface Chemistry of Metals and Semiconductors, John Wiley and Sons, New York, 1960, pp. 285–310.

HYLAND BIZOT, *Primary Examiner.*

BENJAMIN HENKIN, DAVID L. RECK, H. W. CUMMINGS, *Examiners.*